(12) United States Patent
Mulkey et al.

(10) Patent No.: US 9,331,488 B2
(45) Date of Patent: May 3, 2016

(54) ENCLOSURE AND MESSAGE SYSTEM OF SMART AND SCALABLE POWER INVERTERS

(75) Inventors: Steven L. Mulkey, Cameron Park, CA (US); George Shu-Xing Cheng, Folsom, CA (US); Manuel Martinez, North Highlands, CA (US)

(73) Assignee: CyboEnergy, Inc., Rancho Cordova, CA (US)

( * ) Notice: Subject to any disclaimer, the term of this patent is extended or adjusted under 35 U.S.C. 154(b) by 901 days.

(21) Appl. No.: 13/537,206

(22) Filed: Jun. 29, 2012

(65) Prior Publication Data

US 2013/0002031 A1 Jan. 3, 2013

Related U.S. Application Data

(60) Provisional application No. 61/503,400, filed on Jun. 30, 2011.

(51) Int. Cl.
| | | |
|---|---|---|
| *H02J 1/10* | (2006.01) | |
| *H02M 7/48* | (2007.01) | |
| *H02J 3/38* | (2006.01) | |
| *H02M 7/44* | (2006.01) | |
| *H02M 1/00* | (2006.01) | |

(52) U.S. Cl.
CPC .............. *H02J 3/385* (2013.01); *H02M 7/48* (2013.01); *H02J 1/102* (2013.01); *H02M 7/44* (2013.01); *H02M 2001/007* (2013.01); *Y02E 10/58* (2013.01); *Y10T 307/50* (2015.04); *Y10T 307/707* (2015.04)

(58) Field of Classification Search
CPC ............. H02J 1/12; H02J 3/385; H02M 7/44; H02M 7/48; H02M 2001/007; Y02E 10/58; Y10T 307/50; Y10T 307/707

USPC ....................................................... 307/43, 82
See application file for complete search history.

(56) References Cited

U.S. PATENT DOCUMENTS

| | | | |
|---|---|---|---|
| 5,903,116 | A | 5/1999 | Geis |
| 6,031,294 | A | 2/2000 | Geis |
| 6,055,524 | A | 4/2000 | Cheng |
| 6,192,668 | B1 | 2/2001 | Mackay |
| RE37,126 | E | 4/2001 | Peng |

(Continued)

FOREIGN PATENT DOCUMENTS

| | | |
|---|---|---|
| JP | 09275637 | 10/1997 |
| JP | 2001-008383 | 1/2001 |

OTHER PUBLICATIONS

Rashid H. Muhammad, Power Electronics Handbook, 2007, Academic Press.

(Continued)

*Primary Examiner* — Hal Kaplan
(74) *Attorney, Agent, or Firm* — DLA Piper LLP (US)

(57) ABSTRACT

An enclosure design is disclosed to accommodate and support the unique features and capabilities of the Smart and Scalable Power Inverters or Mini-Inverters that have multiple input channels to easily connect to multiple solar PV panels, invert the DC power to AC power, and daisy chain together to generate AC power to feed the power grid or supply power to electrical devices. Further disclosed is a message system using LEDs (light-emitting diodes) mounted on the enclosure to indicate the system status and the status of each input channel of the Smart and Scalable Mini-Inverters.

17 Claims, 8 Drawing Sheets

(56) References Cited

U.S. PATENT DOCUMENTS

| | | |
|---|---|---|
| 6,265,786 B1 | 7/2001 | Bosley |
| 6,325,142 B1 | 12/2001 | Bosley |
| 6,360,131 B1 | 3/2002 | Cheng |
| 6,381,944 B2 | 5/2002 | Mackay |
| 6,487,096 B1 | 11/2002 | Gilbreth |
| 6,495,929 B2 | 12/2002 | Bosley |
| 6,556,980 B1 | 4/2003 | Cheng |
| 6,577,098 B2 * | 6/2003 | Griffey ............ H02M 7/003 320/103 |
| 6,612,112 B2 | 9/2003 | Gilbreth |
| 6,684,112 B1 | 1/2004 | Cheng |
| 6,684,115 B1 | 1/2004 | Cheng |
| 6,784,565 B2 | 8/2004 | Wall |
| 6,870,279 B2 | 3/2005 | Gilbreth |
| 6,958,550 B2 | 10/2005 | Gilbreth |
| 6,960,840 B2 | 11/2005 | Willis |
| 7,016,743 B1 | 3/2006 | Cheng |
| 7,142,626 B2 | 11/2006 | Cheng |
| 7,152,052 B2 | 12/2006 | Cheng |
| 7,415,446 B2 | 8/2008 | Cheng |
| 7,710,077 B2 * | 5/2010 | Zeng et al. .............. 320/136 |
| 8,102,074 B2 | 1/2012 | Hadar |
| 8,860,241 B2 | 10/2014 | Hadar |
| 8,933,321 B2 | 1/2015 | Hadar |
| 2001/0043052 A1 * | 11/2001 | Griffey et al. ........... 320/114 |
| 2001/0052704 A1 | 12/2001 | Bosley |
| 2002/0073713 A1 | 6/2002 | Mackay |
| 2002/0099476 A1 | 7/2002 | Hamrin |
| 2002/0166324 A1 | 11/2002 | Willis |
| 2003/0007369 A1 | 1/2003 | Gilbreth |
| 2003/0111103 A1 | 6/2003 | Bower |
| 2004/0103669 A1 | 6/2004 | Willis |
| 2004/0119291 A1 | 6/2004 | Hamrin |
| 2004/0135436 A1 | 7/2004 | Gilbreth |
| 2004/0264225 A1 | 12/2004 | Bhavaraju |
| 2007/0040532 A1 * | 2/2007 | Bae et al. ................. 318/801 |
| 2008/0050349 A1 | 2/2008 | Stewart |
| 2008/0111517 A1 | 5/2008 | Pfeifer |
| 2008/0283118 A1 | 11/2008 | Rotzoll |
| 2009/0000654 A1 | 1/2009 | Rotzoll |
| 2009/0159113 A1 | 6/2009 | Morimoto |
| 2009/0160258 A1 | 6/2009 | Allen et al. |
| 2009/0174259 A1 | 7/2009 | Lin et al. |
| 2010/0202177 A1 | 8/2010 | Kajouke |
| 2010/0231045 A1 | 9/2010 | Collins et al. |
| 2010/0237703 A1 | 9/2010 | Stern |
| 2011/0012430 A1 | 1/2011 | Cheng |
| 2011/0148195 A1 | 6/2011 | Lee |
| 2011/0231456 A1 * | 9/2011 | Choi ............................. 707/822 |
| 2011/0273022 A1 | 11/2011 | Dennis |
| 2012/0025618 A1 | 2/2012 | Erickson |
| 2012/0104872 A1 | 5/2012 | Marroquin |
| 2012/0138123 A1 | 6/2012 | Newdoll |
| 2012/0212065 A1 | 8/2012 | Cheng et al. |
| 2012/0313443 A1 | 12/2012 | Cheng et al. |
| 2013/0002031 A1 | 1/2013 | Mulkey et al. |
| 2014/0252862 A1 | 9/2014 | Cheng et al. |
| 2014/0265584 A1 | 9/2014 | Cheng et al. |

OTHER PUBLICATIONS

Maniktala, Sanjaya., "Switching Power Supplies A to Z," Elsevier, 2006.
International Search Report issued in PCT/US2010/042123 mailed Feb. 22, 2011.
Written Opinion issued in PCT/US2010/042123 mailed Feb. 22, 2011.
R. Jones. "The Measurement of Lumped Parameter Impedence: A Metrology Guide," University of Michigan, Jan. 1974.
International Preliminary Report on Patentability issued in PCT/US2010/042123 on Jan. 26, 2012.
Related U.S. Appl. No. 12/837,162 electronically captured on Dec. 2, 2013.
Related U.S. Appl. No. 13/397,402 electronically captured on Dec. 2, 2013.
Related U.S. Appl. No. 13/493,622 electronically captured on Dec. 2, 2013.
International Search Report and Written Opinion issued in PCT/US2012/041923 on Jan. 17, 2013.
Related U.S. Appl. No. 12/837,162 electronically captured on May 2, 2014.
Related U.S. Appl. No. 13/844,484.
Related U.S. Appl. No. 13/397,402 electronically captured on Jul. 24, 2015.
Related U.S. Appl. No. 13/846,708.
Related U.S. Appl. No. 14/299,705.
International Search Report issued in PCT/US2014/030888 dated Aug. 20, 2014.
English Language Abstract and Translation for JP 2001-008383 published Jan. 12, 2001.
Australian Office Action issued in AU 2012267441 dated Dec. 21, 2015.

* cited by examiner

ENCLOSURE AND MESSAGE SYSTEM OF SMART AND SCALABLE POWER INVERTERS

This application claims priority to U.S. Provisional Application No. 61/503,400 filed on Jun. 30, 2011, which is herein incorporated by reference.

The subject of this patent relates to an enclosure and a message system for the Smart and Scalable Power Inverters or Mini-Inverters that invert DC (direct current) power from single or multiple DC power sources to single-phase or three-phase AC (alternating current) power, where the DC power sources include but are not limited to photovoltaic (PV) solar modules, fuel cells, batteries, and other DC power generators; and the generated AC power can be sent to an electrical power grid or to an AC load that is not connected to the power grid.

In the U.S. patent application Ser. No. 12/837,162, the entirety of which is hereby incorporated by reference, we described the novel Smart and Scalable Power Inverters and the unique scalable design so that the DC to AC power inversion system can include as few as one inverter and one DC source, up to a selected number of inverters and multiple DC sources. A number of smart single-input, dual-input, triple-input, quad-input, and multiple-input power inverters in a mixed variety can easily connect to single, dual, triple, quad, and multiple DC power sources, invert the DC power to AC power, and daisy chain together to generate a total power, which is equal to the summation of the AC power supplied by each smart and scalable power inverter.

In the U.S. patent application No. 61/442,991, the entirety of which is hereby incorporated by reference, we described the Scalable and Redundant Mini-Inverters that have double, triple, or quadruple redundant capabilities so that the Mini-Inverters can work in a harsh environment for a prolonged period of time. A number of regular, redundant, triple redundant, or quadruple redundant Mini-Inverters with one, two, three, or multiple input channels in a mixed variety can easily connect to one, two, three, or multiple DC power sources such as solar PV modules, invert the DC power to AC power, and daisy chain together to generate AC power to feed the power grid.

In the U.S. patent application No. 61/495,540, the entirety of which is hereby incorporated by reference, we described the Smart and Scalable Off-Grid Mini-Inverters that not only have the key scalable and redundant features as described in U.S. patent applications Ser. No. 12/837,162 and Ser. No. 61/442,991, but can also supply power to electrical devices that are not connected to the power grid including motors, pumps, fans, lights, appliances, and homes.

In this patent, we disclose the design of an enclosure that can accommodate and support the unique features and capabilities of the Smart and Scalable Power Inverters or Mini-Inverters. Further disclosed is a message system using LEDs (light-emitting diodes) mounted on the enclosure to indicate the system status and the status of each input channel of the Smart and Scalable Mini-Inverters.

Figure 4:
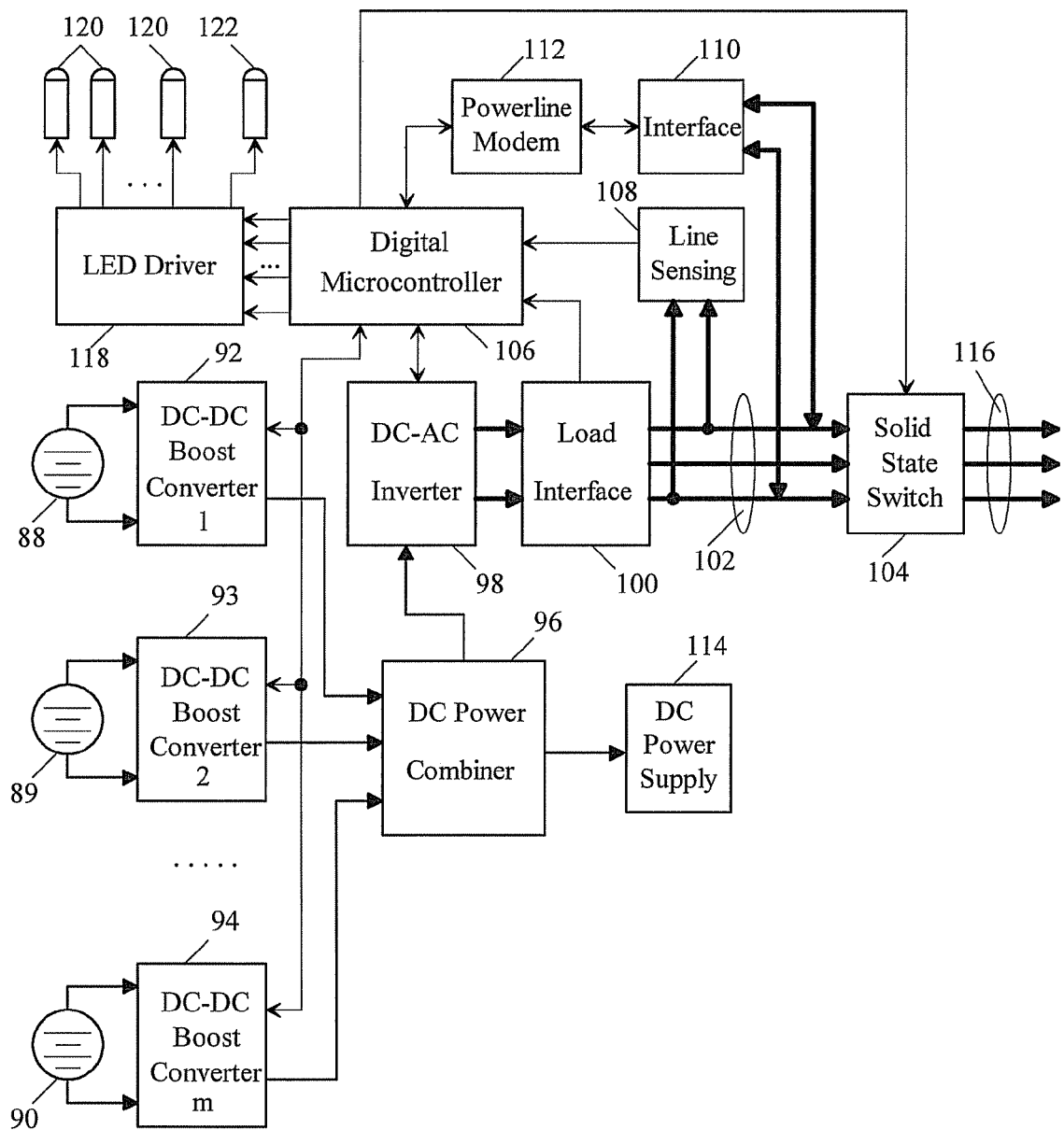

FIG. 4 is a block diagram illustrating an m-channel smart and scalable Mini-Inverter that inverts the DC power from m solar panels to single-phase AC power, in which a message system with multiple LEDs (light-emitting diodes) is controlled by a digital microcontroller to indicate the system status and the status of each input channel of the Mini-Inverter according to an embodiment of this invention.

Figure 5:
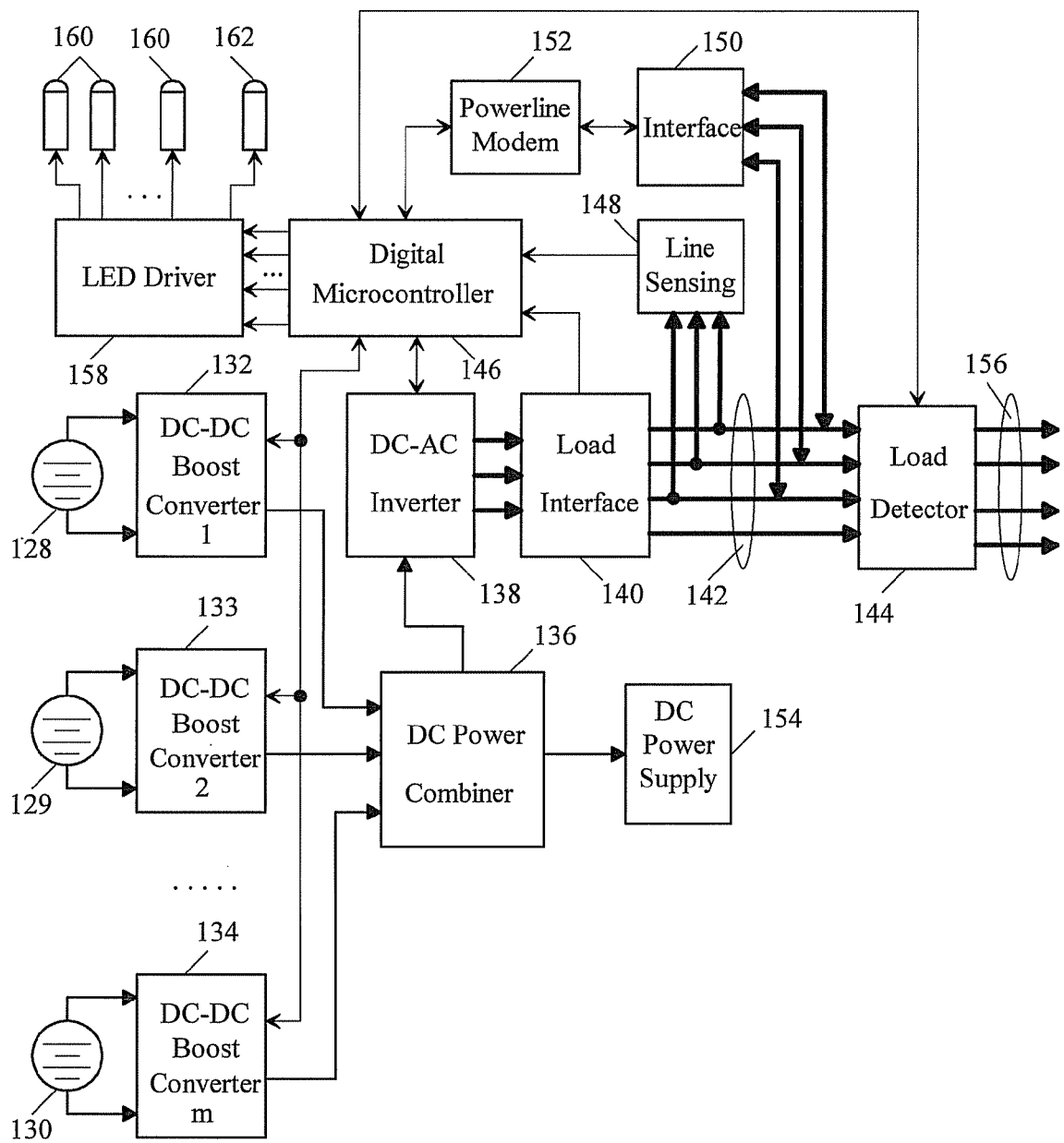

FIG. 5 is a block diagram illustrating an m-channel smart and scalable off-grid AC Master Mini-Inverter that inverts the DC power from m solar panels to three-phase AC power, in which a message system with multiple LEDs is controlled by a digital microcontroller to indicate the system status and the status of each input channel of the Mini-Inverter according to an embodiment of this invention.

Figure 6:
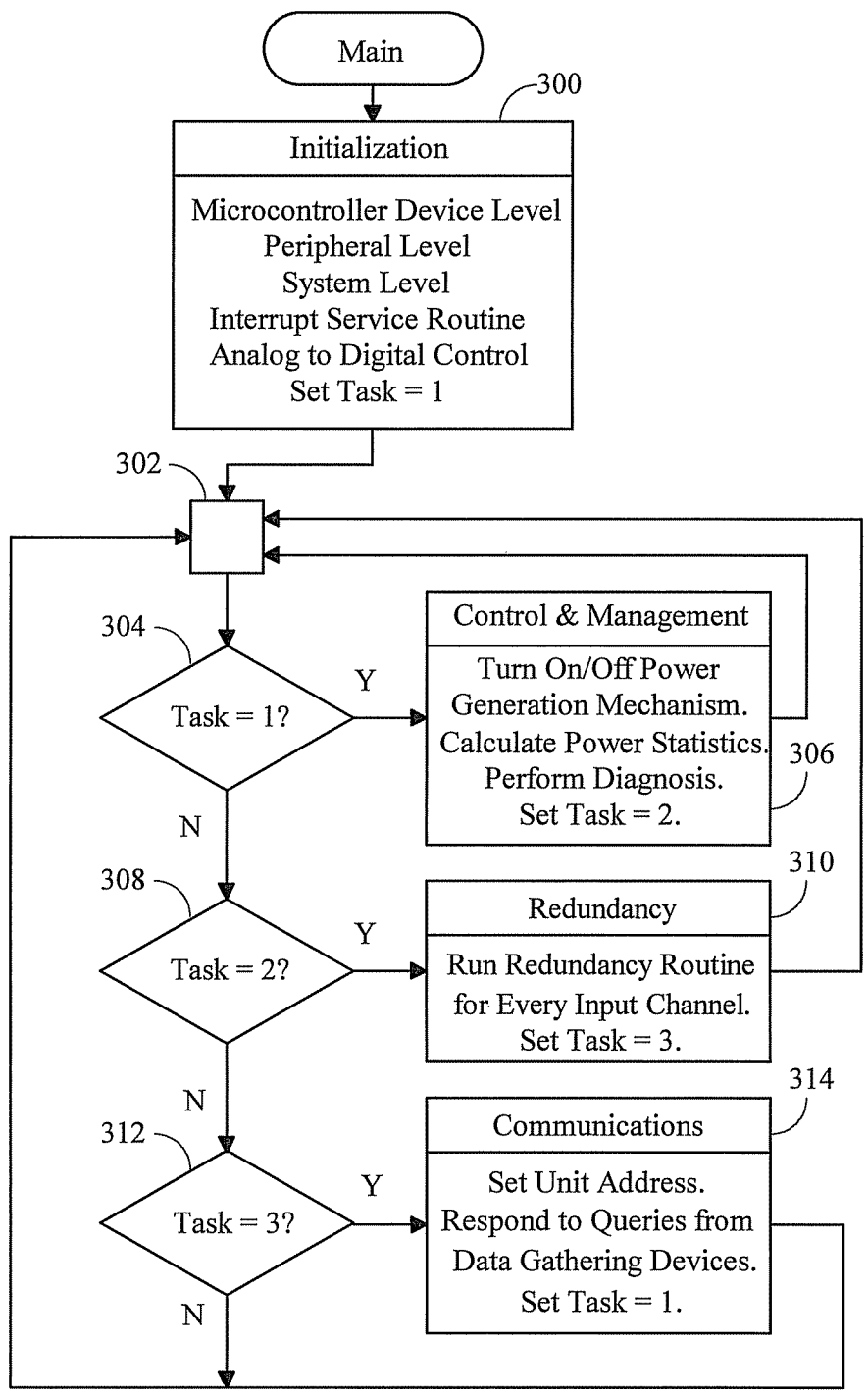

FIG. 6 is a flow chart describing the main software program running in the digital microcontroller of a smart and scalable Mini-Inverter, which includes Control & Management tasks, Redundancy tasks, and Communication tasks.

Figure 7:
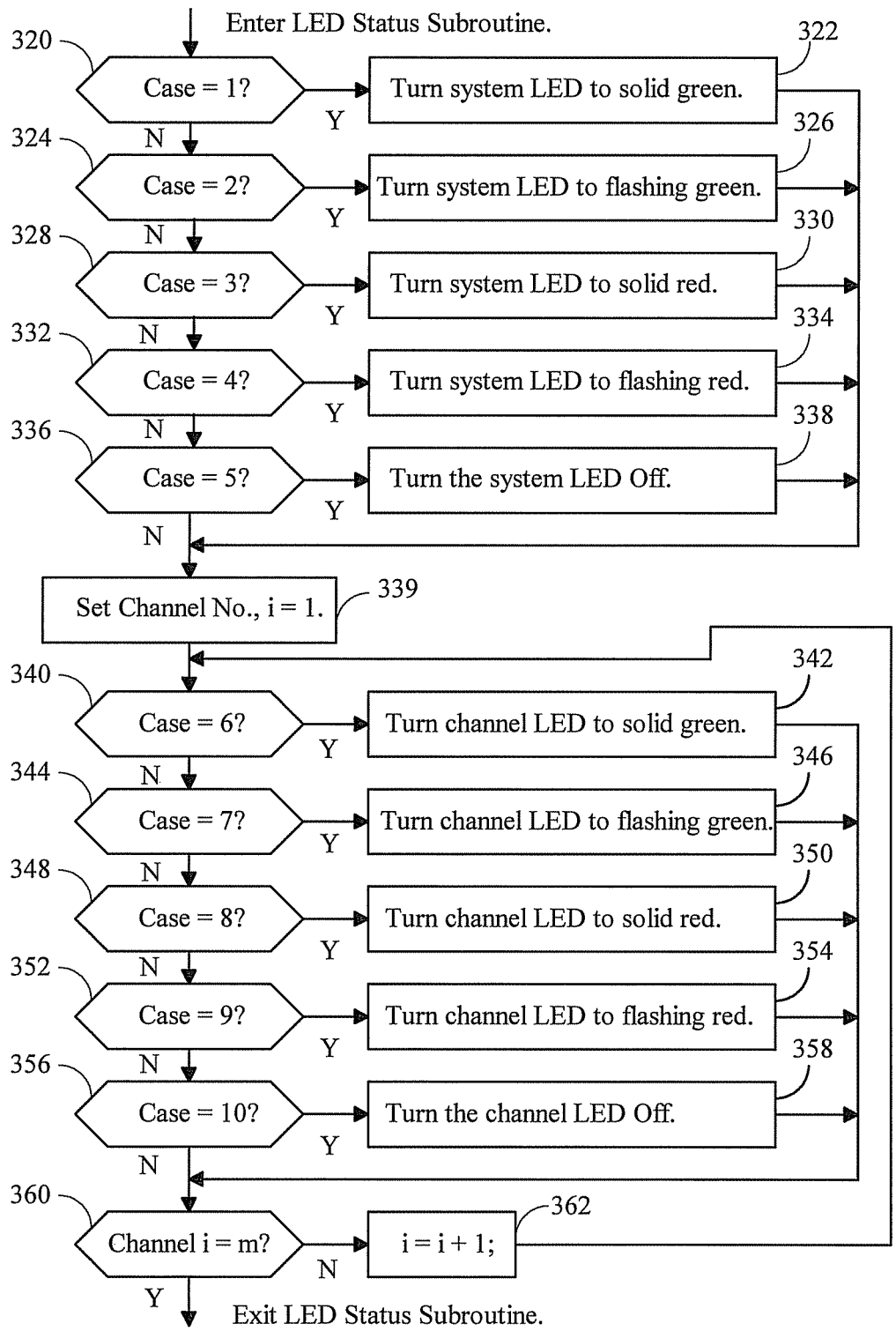

FIG. 7 is a flow chart describing the LED Status Subroutine, which is invoked by the Diagnosis Mechanism of FIG. 6, running in the digital microcontroller of an m-channel smart and scalable Mini-Inverter, which sends signals to the LEDs on the Mini-Inverter enclosure to indicate the inverter status according to an embodiment of this invention.

Figure 8:
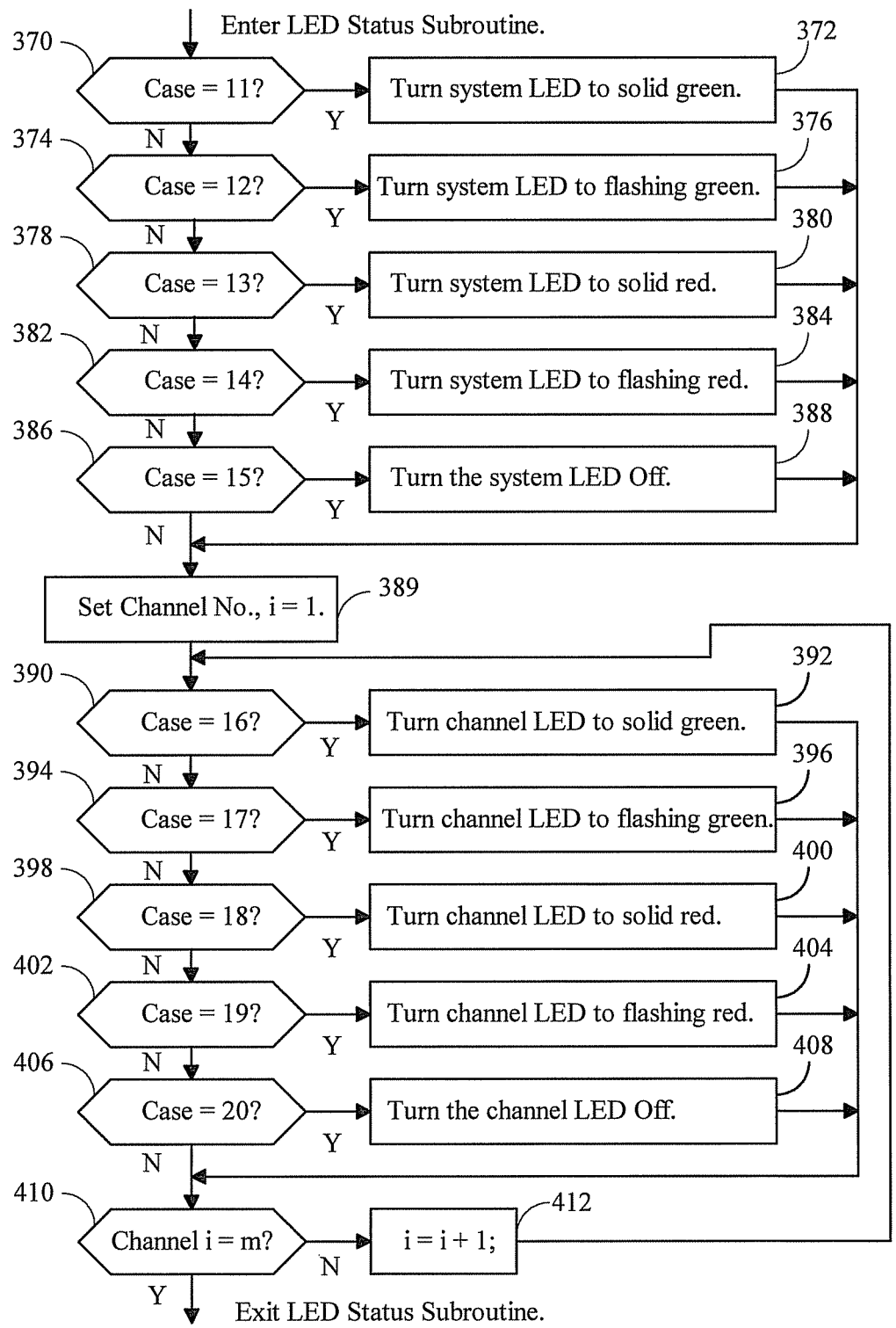

FIG. 8 is a flow chart describing the LED Status Subroutine, which is invoked by the Diagnosis Mechanism of FIG. 6, running in the digital microcontroller of an m-channel smart and scalable off-grid AC Master Mini-Inverter, which sends signals to the LEDs on the Mini-Inverter enclosure to indicate the inverter status according to an embodiment of this invention.

The term "mechanism" is used herein to represent hardware, software, or any combination thereof. The term "solar module" or "solar panel" refers to photovoltaic (PV) solar modules. The term "AC load" is used herein to represent one or more single-phase or three-phase electrical devices including but not limited to motors, pumps, fans, lights, appliances, and homes. The term "AC Master" is used herein to represent a special off-grid Mini-Inverter in a solar power generation system to generate AC power for off-grid applications as described in U.S. patent application No. 61/495,540.

Throughout this document, m=1, 2, 3, . . . , as an integer, which is used to indicate the number of the DC input ports of a Mini-Inverter. The term "input channel" refers to the DC input port of the Mini-Inverter. Then, an m-channel Mini-Inverter means that the Mini-Inverter has m input channels or m DC input ports.

Throughout this document, if a power inversion system or a power inverter is used to generate single-phase AC, it can also be applied to three-phase AC without departing from the spirit or scope of our invention. If a power inversion system or a power inverter is used to generate three-phase AC, it can also be applied to single-phase AC without departing from the spirit or scope of our invention.

Without losing generality, all numerical values given in this patent are examples. Other values can be used without departing from the spirit or scope of our invention. The description of specific embodiments herein is for demonstration purposes and in no way limits the scope this disclosure to exclude other not specially described embodiments of this invention.

DESCRIPTION

Figure 1:
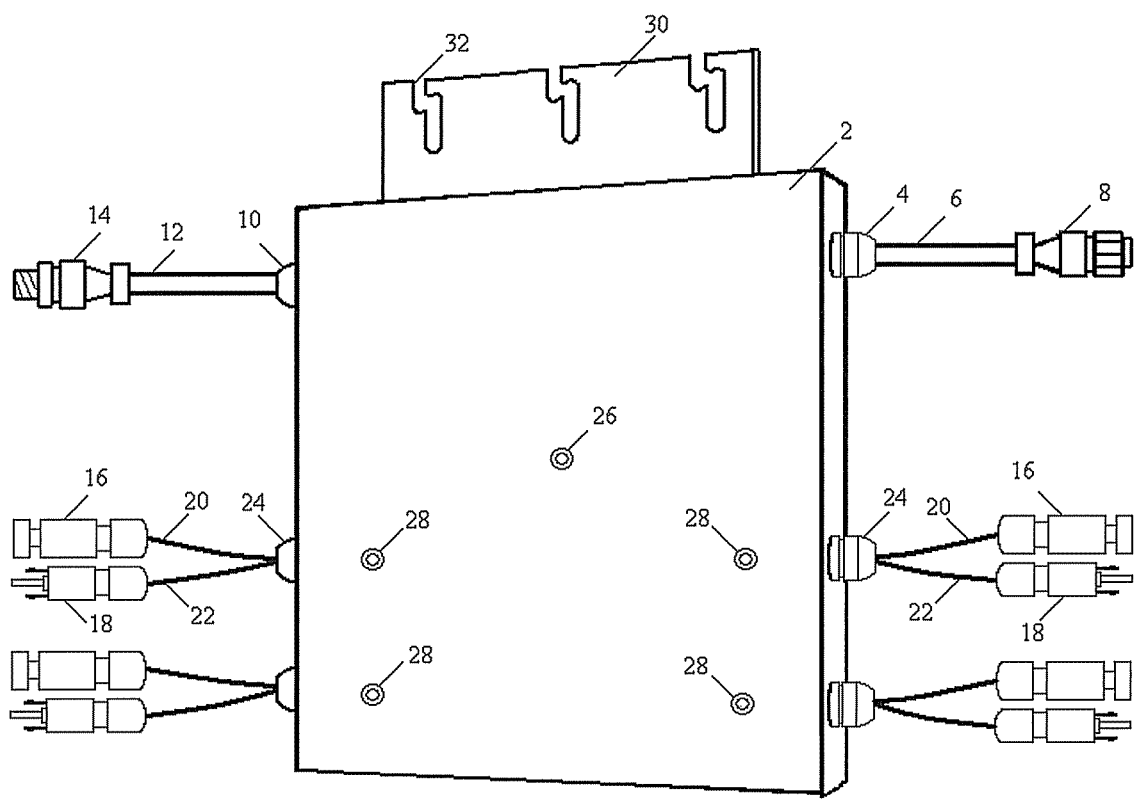
FIG. 1 is a drawing showing a perspective view of a 4-channel scalable Mini-Inverter enclosure according to an embodiment of this invention.

FIG. 1 is a drawing showing a perspective view of a 4-channel scalable Mini-Inverter enclosure according to an embodiment of this invention. The enclosure is comprised of a metal case 2; an AC input port grommet 4, an AC input port cable 6, an AC input port connector 8, an AC output port grommet 10, an AC output port cable 12, an AC output port connector 14, a system status LED 26, a mounting bracket 30, and three mounting slots 32. For each input channel, the enclosure is also comprised of a DC female connector 16, a DC male connector 18, a pair of DC cables 20 and 22, a DC grommet 24, and a channel status LED 28. In FIG. 1, a 4-channel Mini-Inverter enclosure is shown. That means, there are 4 pairs of DC cables and connectors and 4 channel status LEDs. Without losing generality, similar design can be made to include 1, 2, 3, . . . , m channels, where m is an integer to indicate the number of the DC input channels of a Mini-Inverter.

The metal case can be made of aluminum. A layer of conductive and non-corrosive layer such as alodine can be applied to the metal case surface for corrosion protection. In the solar power industry, most solar panels are shipped with a pair of standard MC4 DC connectors with DC cables. Therefore, the Mini-Inverter enclosure is designed to include a pair of standard MC4 DC connectors for each input channel to connect to the DC connectors of its corresponding solar panel.

There are no standards for the AC cables and connectors in the solar power industry. Since a Mini-Inverter will daisy chain with the next Mini-Inverter, the Mini-Inverter enclosure is designed to include a mare AC connector for the AC output port, and a female AC connector for the AC input port. Although we say the power inverters daisy chain, where the output port of each Mini-Inverter is connected to the input port of the next Mini-Inverter, the actual connection of the inverters is pass-through. That means, the generated AC power from each Mini-Inverter is added in parallel onto the AC powerline. For the same reason, the AC input port with a female AC connector can also be viewed as an AC output port, and the AC output port with a male AC connector can also be viewed as an AC input port. For a single-phase or split-phase Mini-Inverter, the AC cable can be designed to include 3-wires for L1, L2, and Neutral. The user is required to install the earth ground for the solar power system including any metal structure, solar panels and inverters. For a three-phase Mini-Inverter, the AC cable should include 4-wires for phase 1, 2, 3, and Neutral. Again, the user is required to ground any metal structure of the system including PV panels and inverters.

The mounting bracket 30 is used to mount the Mini-Inverter onto the solar panel metal frame at the back side of a solar panel. Three mounting slots 32 are designed to allow secured mounting.

Figure 2:
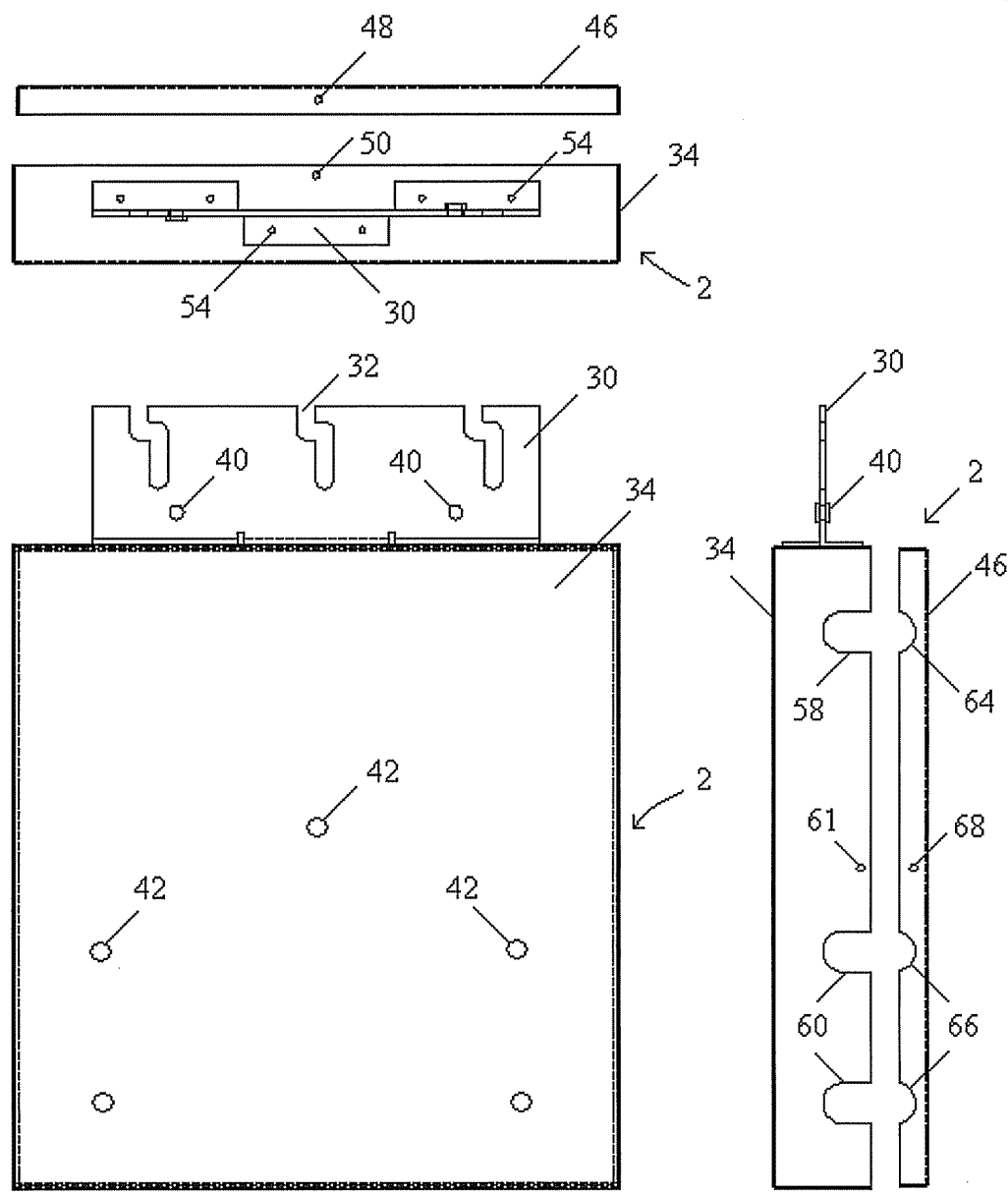
FIG. 2 is a drawing showing the front view, top view, and side view of a 4-channel scalable Mini-Inverter enclosure according to an embodiment of this invention.

FIG. 2 is a drawing showing the front view, top view, and side view of a 4-channel scalable Mini-Inverter enclosure according to an embodiment of this invention. The front view drawing shows the top part 34 of the metal case 2, a mounting bracket 30, three mounting slots 32, two grounding screw holes 40, and five LED holes 42. The top view drawing shows the top part 34 of the metal case 2, the bottom part 46 of the metal case 2, metal case attachment rivet holes 48 and 50, mounting bracket 30, and six mounting bracket welding points 54. The right side view drawing shows the top part 34 of the metal case 2, AC cable cutout 58, DC cable cutouts 60, metal case attachment rivet holes 61 and 68, bottom part 46 of the metal case 2, AC cable cutout 64, DC cable cutouts 66, mounting bracket 30, and grounding screw holes 40.

Figure 3:
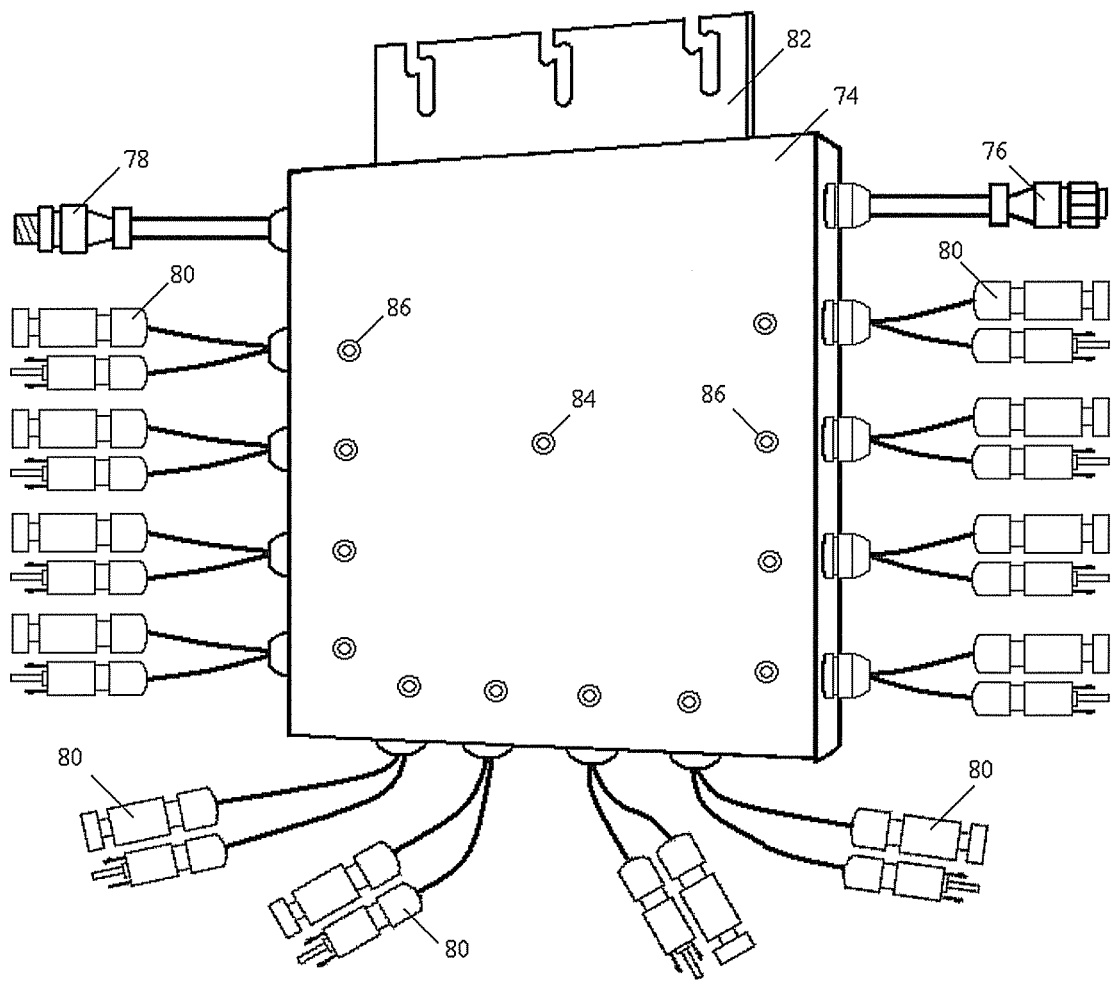
FIG. 3 is a drawing showing a perspective view of a 12-channel scalable Mini-Inverter enclosure according to an embodiment of this invention.

FIG. 3 is a drawing showing a perspective view of a 12-channel scalable Mini-Inverter enclosure according to an embodiment of this invention. As an example, a Mini-Inverter that has 12 input channels can connect to 12 thin-film solar panels with power ratings of 75-88 Watts to produce a maximum AC power of 1,000 Watts. As another example, a larger size Mini-Inverter that has 12 input channels can connect to 12 crystalline silicon based solar panels with power ratings of 200-260 Watts to produce a maximum AC power of 3,000 Watts.

The 12-channel Mini-Inverter enclosure is comprised of a metal case 74, an AC input port cable and connector 76, an AC output port cable and connector 78, 12 pairs of DC cables and connectors 80, a mounting bracket 82, a system status LED 84, and 12 input-channel status LEDs 86. Similar designs can accommodate a smaller or larger number of input channels for the smart and scalable Mini-Inverters.

FIG. 4 is a block diagram illustrating an m-channel smart and scalable Mini-Inverter that inverts the DC power from m solar panels to single-phase AC power, in which a message system with multiple LEDs (light-emitting diodes) is controlled by a digital microcontroller to indicate the system status and the status of each input channel of the Mini-Inverter according to an embodiment of this invention. The Mini-Inverter comprises m DC-DC boost converters 92, 93, . . . , 94, a DC power combiner 96, a DC-AC inverter 98, a load interface circuit 100, an internal AC powerline 102, a solid-state switch 104, a digital microcontroller 106, a line sensing circuit 108, an interface circuit for powerline communications 110, a powerline communications Modem 112, a DC power supply 114, an external AC powerline 116, an LED driver circuit 118, m channel status LEDs 120, and a system status LED 122.

The power from DC sources 88, 89, . . . , 90 is delivered to the corresponding DC-DC boost converters 92, 93, . . . , 94, respectively. The DC power is then combined in the DC power combiner 96. The total combined DC power is inverted to AC power with voltage larger than 240VAC by the DC-AC inverter 98. The generated AC power goes through the load interface circuit 100 to be combined with the AC power in the internal AC powerline 102. A solid-state switch 104 controlled by the digital microcontroller 106 is used to isolate the internal AC powerline 102 from the external AC powerline 116 when solar power is not being generated. A line sensing circuit 108 connected to the AC powerline 102 is used to detect the phase and zero-crossing point of the incoming AC power from the power grid. The phase and zero-crossing point signals are sent to the digital microcontroller 106 for AC power synchronization to assure that the Mini-Inverter provides high quality synchronized power to the grid. A powerline communications Modem 112, which is isolated by an interface circuit 110, is used to establish a 2-way digital signal communication between the digital microcontroller 106 and the outside world through the AC powerline. The DC power combiner 96 provides adequate power to the DC power supply 114, which supplies DC power to the electronic components of the Mini-Inverter.

The DC-DC boost converters that can be used in this embodiment are any of a number of well known converters described in the "Power Electronics Handbook" edited by Muhammad H. Rashid, published by Academic Press in 2007, including Buck Converter, Boost Converter, Buck-Boost Converter, Super-Lift Luo Converter, and Cascade Boost Converter. The DC-AC inverters that can be used in this embodiment are any of a number of well known DC-AC inverters described in the same book including Half-Bridge Inverter, Full-Bridge Inverter, Bipolar PWM Inverter, Unipolar PWM Inverter, and Sinusoidal PWM Inverter. The DC combiners used in this embodiment can be designed with a circuit that allow the output from all DC-DC boost converters to connect in parallel so that all DC currents will be added together. The Powerline Modem that can be used in this embodiment can be any of a number of commercially available integrated circuits capable of providing 2-way digital communications through a powerline. Other modules discussed in this embodiment including load interface, solid state switch, line sensing circuit, powerline interface circuit, and DC power supply can be implemented using one or more known combinations of conventional electronic components such as resisters, capacitors, inductors, solid-state switches, transformers, diodes, transistors, operational amplifiers, and ceramic filters, etc.

An LED driver circuit 118 controlled by the digital microcontroller 106 is used to turn a specific LED to certain color and pattern to indicate the system status and the status of each input channel of the Mini-Inverter. The LED driver circuit that can be used in this embodiment is any of a number of well known current drivers such as an emitter follower transistor driver.

The digital microcontroller 106 is used to perform a number of tasks including (i) monitoring the DC boost voltage from each DC-DC boost converter, (ii) controlling the DC-DC boost converters, (iii) performing maximum power point tracking (MPPT) for each input channel, (iv) performing DC-AC inversion and AC power synchronization, (v) monitoring AC current and voltage for generated power amount and status, (vi) performing powerline communications, (vii) performing logic controls such as AC powerline switching and isolation, (viii) performing diagnosis functions, (ix) driving LED driver circuits, and (x) performing the functions of the message system.

For an m-channel smart and scalable Mini-Inverter, a message system is designed to include one 2-color LED to show the system status of the Mini-Inverter. The Case number, LED color (green or red), pattern (solid or flashing), and corresponding indicated messages for the system status is listed in Table 1.

TABLE 1

| Case | Green | Red | Solar Power System Status | Possible Issues |
|---|---|---|---|---|
| 1 | Solid | — | Mini-Inverter is Working. | |
| 2 | Flashing | — | Mini-Inverter is Working but Has Warnings. | a. Communication error. b. Inverter output AC voltage approaching limits. c. Inverter output AC current approaching limits. |
| 3 | — | Solid | Mini-Inverter Error. | a. Inverter output AC voltage out of limits. b. Inverter output AC current out of limits. |
| 4 | — | Flashing | Power Grid Error. | a. Grid AC frequency out of limits. b. Grid AC voltage out of limits. |
| 5 | — | — | LED is OFF. | a. Not enough PV power. Mini-Inverter is off. b. Not enough PV power to generate AC, but the digital microcontroller is running. c. There is enough PV power and the Mini-Inverter is waking up. d. LED error, if there is power in the system. |

The message system for the m-channel smart and scalable Mini-Inverter also includes m 2-color LEDs to show the status for each input channel of the Mini-Inverter. The Case number, LED color (green or red), pattern (solid or flashing), and corresponding indicated messages for the input channel status is listed in Table 2.

TABLE 2

| Case | Green | Red | DC Input Channel Status | Possible Issues |
|---|---|---|---|---|
| 6 | Solid | — | Input Channel is Working. | |
| 7 | Flashing | — | Low Input DC Voltage from Solar Panel. | Channel temperature approaching limits. |
| 8 | — | Solid | Input Channel Error | Defective Channel. |
| 9 | — | Flashing | Input Channel Warning. | a. Channel out of temperature limits. b. Channel out of voltage limits. c. Channel out of current limits. |
| 10 | — | — | LED is OFF. | a. Not enough PV power. Mini-Inverter is off. b. Not enough PV power to generate AC in this channel, but the digital microcontroller is running. c. There is enough PV power in this channel and the Mini-Inverter is waking up. d. LED error, if there is power in the system. |

FIG. 5 is a block diagram illustrating an m-channel smart and scalable off-grid AC Master Mini-Inverter that inverts the DC power from m solar panels to three-phase AC power, in which a message system with multiple LEDs is controlled by a digital microcontroller to indicate the system status and the status of each input channel of the Mini-Inverter according to an embodiment of this invention. The Mini-Inverter comprises m DC-DC boost converters 132, 133, . . . , 134, a DC power combiner 136, a DC-AC inverter 138, a load interface circuit 140, an internal AC powerline 142, a load detector 144, a digital microcontroller 146, a line sensing circuit 148, an interface circuit for powerline communications 150, a powerline communications Modem 152, a DC power supply 154, an external AC powerline 156, an LED driver circuit 158, m channel status LEDs 160, and a system status LED 162.

The power from DC sources 128, 129, . . . , 130 is delivered to the corresponding DC-DC boost converters 132, 133, . . . , 134, respectively. The DC power is then combined in the DC power combiner 136. The total combined DC power is inverted to AC power within a user specified voltage range such as 120VAC+/−10% or 240VAC+/−10% by the DC-AC inverter 138. The generated AC power goes through the load interface circuit 140 to be combined with the AC power in the internal AC powerline 142. A line sensing circuit 148 connected to the AC powerline 142 is used to detect if there is AC power on the powerline prior to the startup of the AC Master Mini-Inverter. The line sensing circuit 148 is also used for monitoring the load on the AC powerline for over voltage, under voltage, over current, or under current conditions so that the total AC output voltage can be regulated to protect the Mini-Inverters in the power generation system and the AC load. A powerline communications Modem 152, which is isolated by an interface circuit 150, is used to establish a 2-way digital signal communication between the digital microcontroller 146 and the outside world through the AC powerline. The DC power combiner 136 provides adequate power to the DC power supply 154, which supplies DC power to the electronic components of the Mini-Inverter.

The load detector 144 is an electronic circuit that can detect the impedance of the connected AC load. If no AC power is detected on the powerline, the load detector 144 checks the impedance of the AC powerline to determine if the connected AC load is within certain specifications. The load detector in this embodiment can be designed using standard. LRC meter impedance measurement circuits and mechanism such as those described in the book, "The measurement of Lumped Parameter Impedance: A Metrology Guide" published by University of Michigan Library in January 1974.

An LED driver circuit 158 controlled by the digital microcontroller 146 is used to turn a specific LED to certain color and pattern to indicate the system status and the status of each input channel of the off-grid AC Master Mini-Inverter. The LED driver circuit that can be used in this embodiment is any of a number of well known current drivers such as an emitter follower transistor driver.

For an m-channel smart and scalable off-grid AC Master Mini-Inverter, the digital microcontroller 146 performs the tasks including (i) monitoring the DC boost voltage from each DC-DC boost converter, (ii) controlling the DC-DC boost converters, (iii) performing maximum power point tracking (MDPT) for each input channel, (iv) performing DC-AC inversion, (v) monitoring AC current and voltage for generated power amount and status, (vi) performing powerline communications, (vii) checking the impedance of the AC powerline to determine if the connected AC load is within certain specifications, (viii) initially energizing the AC powerline that has no power running to it, (ix) continually delivering AC power to the AC powerline to allow the other off-grid Mini-Inverters also connected on the same powerline to synchronize the AC power being produced, (x) continually checking and determining whether the AC load is too large or too small for the power generation system to handle, (xi) turning the power off and triggering an error signal if the load is too large or too small, (xii) performing diagnosis functions, (xiii) driving LED driver circuits, and (xiv) performing the functions of the message system.

For an m-channel off-grid AC Master Mini-Inverter, a message system is designed to include one 2-color LED to show the system status of the Mini-Inverter. The Case number, LED color (green or red), pattern (solid or flashing), and corresponding indicated messages for the system status is listed in Table 3.

TABLE 3

| Case | Green | Red | Solar Power System Status | Possible Issues |
|---|---|---|---|---|
| 11 | Solid | — | Mini-Inverter is Working. | |
| 12 | Flashing | — | Mini-Inverter is Working but Has Warnings. | a. Communication error. b. Inverter output AC voltage approaching limits. c. Inverter output AC current approaching limits. |
| 13 | — | Solid | Mini-Inverter Error. | a. Inverter output AC voltage out of limits. b. Inverter output AC current out of limits. c. AC is present. d. Failed impedance test. |
| 14 | — | Flashing | AC Load Error. | a. Load AC frequency out of limits. b. Load AC voltage out of limits. c. Load AC current out of limits. |
| 15 | — | — | LED is OFF. | a. Not enough PV power. Mini-Inverter is off. b. Not enough PV power to generate AC, but the digital microcontroller is running. c. There is enough PV power and the Mini-Inverter is waking up. d. LED error, if there is power in the system. |

The message system for the m-channel off-grid AC Master Mini-Inverter also includes m 2-color LEDs to show the status for each input channel of the Mini-Inverter. The Case number, LED color (green or red), pattern (solid or flashing), and corresponding indicated messages for the input channel status is listed in Table 4.

TABLE 4

| Case | Green | Red | Solar Power System Status | Possible Issues |
|---|---|---|---|---|
| 16 | Solid | — | Mini-Inverter is Working. | |
| 17 | Flashing | — | Mini-Inverter is Working but Has Warnings. | a. Communication error. b. Inverter output AC voltage approaching limits. c. Inverter output AC current approaching limits. |
| 18 | — | Solid | Mini-Inverter Error. | a. Inverter output AC voltage out of limits. b. Inverter output AC current out of limits. |
| 19 | — | Flashing | AC Load Error. | a. Load AC frequency out of limits. b. Load AC voltage out of limits. c. Load AC current out of limits. |
| 20 | — | — | LED is OFF. | a. Not enough PV power. Mini-Inverter is off. b. Not enough PV power to generate AC in this channel, but the digital microcontroller is running. c. There is enough PV power in this channel and the Mini-Inverter is waking up. d. LED error, if there is power in the system. |

FIG. 6 is a flow chart describing the main software program running in the digital microcontroller of a smart and scalable Mini-Inverter, which includes Control & Management tasks, Redundancy tasks, and Communication tasks. At Block 300, initialization is taking place in the microcontroller device level, peripheral level, system level, and for the interrupt service routine and analog and digital control routines. More specifically, initialization will include but is not limited to setting up registers, I/Os, and timers and enabling interrupts for the interrupt service routine. At the end, it will set Task=1. In the main program, there are three major tasks. Task 1 is related to the control and management of the Mini-Inverter. Task 2 is related to the redundancy of the Mini-Inverter. Task 3 is related to the communications of the Mini-Inverter to the outside world through the powerline Modem. After initialization, the main program enters the main loop entry point 302 and then goes to Block 304.

At Block 304, the program checks to see if Task 1 is scheduled to run. If the answer is Yes, the program will execute the functions in Block 306 to (i) turn on/off the power generation mechanism based on the conditions of the DC power source(s), the Mini-Inverter, and the AC powerline, (ii)

calculate power statistics such as the amount of power generated during a certain period of time, and (iii) perform system diagnosis. Then, it sets Task=2 and returns to Block 302, which is the entry of the main loop.

When the program continues, it will go through Block 304, and reach Block 308. At Block 308, the program checks to see if Task 2 is scheduled to run. If the answer is Yes, the program will execute the functions in Block 310 to run the redundancy routine for each input channel that the Mini-Inverter has. Then, it sets Task=3 and returns to Block 302.

When the program further continues, it will go through Block 304 and 308, and reach Block 312. At Block 312, the program checks to see if Task 3 is scheduled to run. If the answer is Yes, the program will execute the functions in Block 314 to (i) set the unit address for the Mini-Inverter, and (ii) respond to queries from data gathering or acquisition devices to report the power statistics. Then, it sets Task=1 and returns to Block 302. The main program runs continuously based on a preset loop rate to execute the scheduled tasks. At any time an interrupt is triggered, the digital microcontroller immediately processes the pending interrupt service routine.

The key components, functions, and steps in the interrupt service routine embedded in the digital microcontroller are described in the U.S. patent application Ser. No. 12/837,162.

FIG. 7 is a flow chart describing the LED Status Subroutine, which is invoked by the Diagnosis Mechanism at Block 306 of FIG. 6, running in the digital microcontroller of an m-channel smart and scalable Mini-Inverter, which sends signals to the LEDs on the Mini-Inverter enclosure to indicate the inverter status according to an embodiment of this invention. The Diagnosis Mechanism comprises hardware and software to watch the status of the Mini-Inverter in real-time based on case statement tables as illustrated in Tables 1 and 2. As listed in these tables, Case 1 to Case 5 indicate the system status and Case 6 to Case 10 indicate the channel status for each input channel. The LED status subroutine can simply turn the corresponding LED to the color and pattern based on the Case number.

At Block 320, the subroutine checks if Case=1, if it is, the subroutine will go to Block 322 and turn the system LED to solid green, and then go to Block 339. If the answer is No, the subroutine will go to Block 324 to check if Case=2. If it is, the subroutine will go to Block 326 and turn the system LED to flashing green, and then go to Block 339. If the answer is No, the subroutine will go to Block 328 to check if Case=3. If it is, the subroutine will go to Block 330 and turn the system LED to solid red, and then go to Block 339. If the answer is No, the subroutine will go to Block 332 to check if Case=4. If it is, the subroutine will go to Block 334 and turn the system LED to flashing red, and then go to Block 339. If the answer is No, the subroutine will go to Block 336 to check if Case=5. If it is, the subroutine will go to Block 338 and turn the system LED off, and then go to Block 339. If the answer is No, the subroutine will proceed to Block 339.

Since there are multiple input channels in a scalable Mini-Inverter, the subroutine is designed to have a loop to go through each of the input channels. Let us use i as the software loop number and assume the total number of input channel is m. At Block 339, we will first set the channel number to 1 by letting i=1. At Block 340, the subroutine checks if Case=6, if it is, the subroutine will go to Block 342 and turn the corresponding channel LED to solid green, and then go to Block 360. If the answer is No, the subroutine will go to Block 344 to check if Case=7. If it is, the subroutine will go to Block 346 and turn the corresponding channel LED to flashing green, and then go to Block 360. If the answer is No, the subroutine will go to Block 348 to check if Case=8. If it is, the subroutine will go to Block 350 and turn the corresponding channel LED to solid red, and then go to Block 360. If the answer is No, the subroutine will go to Block 352 to check if Case=9. If it is, the subroutine will go to Block 354 and turn the corresponding channel LED to flashing red, and then go to Block 360. If the answer is No, the subroutine will go to Block 356 to check if Case=10. If it is, the subroutine will go to Block 358 and turn the corresponding channel LED off, and then go to Block 360. If the answer is No, the subroutine will proceed to Block 360. At Block 360, the subroutine checks if i=m. That means, it checks if the loop has gone through all the input channels. If the answer is No, it will add the channel number by 1 at Block 362 and then starts to check the new channel at Block 340. If the answer is Yes, the subroutine will exit.

FIG. 8 is a flow chart describing the LED Status Subroutine, which is invoked by the Diagnosis Mechanism at Block 306 of FIG. 6, running in the digital microcontroller of an m-channel smart and scalable off-grid AC Master Mini-Inverter, which sends signals to the LEDs on the Mini-Inverter enclosure to indicate the inverter status according to an embodiment of this invention. The Diagnosis Mechanism comprises hardware and software to watch the status of the off-grid AC Master Mini-Inverter in real-time based on case statement tables as illustrated in Tables 3 and 4. As listed in these tables, Case 11 to Case 15 indicate the system status and Case 16 to Case 20 indicate the channel status for each input channel of an off-grid AC Master Mini-Inverter. The LED status subroutine can simply turn the corresponding LED to the color and pattern based on the Case number.

At Block 370, the subroutine checks if Case=11, if it is, the subroutine will go to Block 372 and turn the system LED to solid green, and then go to Block 389. If the answer is No, the subroutine will go to Block 374 to check if Case=12. If it is, the subroutine will go to Block 376 and turn the system LED to flashing green, and then go to Block 389. If the answer is No, the subroutine will go to Block 378 to check if Case=13. If it is, the subroutine will go to Block 380 and turn the system LED to solid red, and then go to Block 389. If the answer is No, the subroutine will go to Block 382 to check if Case=14. If it is, the subroutine will go to Block 384 and turn the system LED to flashing red, and then go to Block 389. If the answer is No, the subroutine will go to Block 386 to check if Case=15. If it is, the subroutine will go to Block 388 and turn the system LED off, and then go to Block 389. If the answer is No, the subroutine will proceed to Block 389.

Since there are multiple input channels in a scalable Mini-Inverter, the subroutine is designed to have a loop to go through each of the input channels. Let us use i as the software loop number and assume the total number of input channel is m. At Block 389, we will first set the channel number to 1 by letting i=1. At Block 390, the subroutine checks if Case=16, if it is, the subroutine will go to Block 392 and turn the corresponding channel LED to solid green, and then go to Block 410. If the answer is No, the subroutine will go to Block 394 to check if Case=17. If it is, the subroutine will go to Block 396 and turn the corresponding channel LED to flashing green, and then go to Block 410. If the answer is No, the subroutine will go to Block 398 to check if Case=18. If it is, the subroutine will go to Block 400 and turn the corresponding channel LED to solid red, and then go to Block 410. If the answer is No, the subroutine will go to Block 402 to check if Case=19. If it is, the subroutine will go to Block 404 and turn the corresponding channel LED to flashing red, and then go to Block 410. If the answer is No, the subroutine will go to Block 406 to check if Case=20. If it is, the subroutine will go to Block 408 and turn the corresponding channel LED off, and then go to Block 410. If the answer is No, the subroutine will proceed to Block 410. At Block 410, the subroutine checks if i=m. That means, it checks if the loop has gone through all the input channels. If the answer is No, it will add the channel number by 1 at Block 412 and then starts to check the new channel at Block 390. If the answer is Yes, the subroutine will exit.

To summarize, since the innovative Smart and Scalable Power Inverters or Mini-Inverters can have multiple input channels to connect to multiple solar panels, the enclosure design has to be unique and practically useful. In addition, the Mini-Inverters have to work in a harsh environment for a prolonged period of time, an LED based message system is an effective and user-friendly way of communicating with the solar system installers. This is especially true when the number of input channels is large. The design of having an LED for each input channel along with the indicated messages can help the installers troubleshoot potential mistakes or problems during the installation process. The inventive enclosure and message system for the Smart and Scalable Mini-Inverters can help the solar power industry reduce the installation cost, which accounts for a big percentage of the total cost for a solar power system.

The invention claimed is:

1. A multiple channel power inverter, comprising:
   a) at least two DC power input channels;
   b) an AC power output port arranged to supply AC power to the AC power grid;
   c) for each DC power input channel, a DC-DC boost converter arranged to convert the voltage of a DC power source to a higher DC voltage suitable for inversion;
   d) a DC power combiner connected to said DC-DC boost converters for combining the DC output from all DC-DC boost converters and allowing the said DC-DC boost converters to connect in parallel so that all DC currents are added together;
   e) a DC-AC inverter connected to said DC power combiner and, arranged to invert the DC power to AC power;
   f) an internal AC powerline that combines the generated AC power with the external AC power from the power grid;
   g) a load interface circuit connected to said DC-AC inverter and to said internal AC powerline, said load interface circuit being arranged to filter high-frequency components out of the said DC-AC inverter's AC output;
   h) a digital microcontroller connected to said DC-DC boost converter, DC-AC inverter, and load interface circuit, said microcontroller arranged to monitor the DC boost voltage, control the DC-DC boost converter, perform maximum power point tracking (MPPT), perform DC-AC inversion and AC power synchronization, monitor AC current and voltage for generated power amount and status, perform powerline communications, and perform logic controls such as AC powerline switching and isolation;
   i) a powerline modem connected to said microcontroller and said internal AC powerline through an interface circuitry for transmitting and receiving performance data between said microcontroller and said power grid;
   j) a line sensing circuit connected to said internal AC powerline and said microcontroller for detecting the phase and zero-crossing point of the incoming AC power from the power grid;
   k) a solid state switch connected to said internal AC powerline and external AC powerline, and arranged to disconnect said internal AC powerline from the AC grid during the non-generation time;
   l) a power supply connected to said DC power combiner and arranged to supply DC power to the electronic components of said power inverter; and
   m) a message system connected to said digital microcontroller and arranged to indicate the status of the power inverter and the status of each input channel.

2. The inverter of claim 1, in which said message system comprises:
   a) a plurality of LEDs (light-emitting diodes); and
   b) an LED driver circuit controlled by the digital microcontroller and arranged to turn the LEDs to a predetermined color and/or pattern to indicate the status of the power inverter and the status of each input channel of the power inverter.

3. The inverter of claim 1, in which said message system includes a system status LED to indicate that
   a) the inverter is working;
   b) the inverter is working but has warnings;
   c) the inverter has errors;
   d) the AC power grid has errors; and
   e) the inverter is off.

4. The inverter of claim 1, in which said message system further includes a channel status LED for each input channel to indicate that
   a) the input channel is working;
   b) the input channel has low input voltage;
   c) the input channel has errors;
   d) the input channel has warnings; and
   e) the input channel is off.

5. The inverter of claim 1, in which the output of the power inverter is single-phase AC or three-phase AC.

6. The inverter of claim 1, further comprising an enclosure, the elements a) through m) being disposed in or on the enclosure.

7. The inverter of claim 6, in which the enclosure includes a metal case and the message system includes a system status LED, the inverter further comprising:
   a) an AC input port grommet attached to the enclosure,
   b) an AC input port cable extending through the grommet,
   c) an AC input port connector connected to the AC input port cable,
   d) an AC output port grommet attached to the enclosure,
   e) an AC output port cable extending through the grommet,
   f) an AC output port connector connected to the AC output port cable, and
   g) a mounting bracket with mounting slots attached to the metal case.

8. The inverter of claim 6, in which the message system includes a channel status LED for each input channel, each input channel further comprising:
   a) a DC grommet attached to the enclosure,
   b) a pair of DC cables extending through the grommet,
   c) a DC female connector connected to one of the DC cables, and
   d) a DC male connector connected to the other DC cable.

9. The inverter of claim 1, in which the said digital microcontroller is programmed with a main program to iteratively:
   a) turn on and off the inverter's generation message based on the DC power source input and conditions of the inverter and AC powerline;
   b) calculate the amount of power generated by the inverter during a predetermined period of time;
   c) perform diagnostics for the inverter's status and operation;
   d) run redundancy routine for every input channel;
   e) set the inverter's unit address;
   f) perform powerline communications; and g) respond to queries from data gathering or acquisition devices to report the power statistics.

10. The inverter of claim 1, in which the message system includes a system status LED, and said digital microcontroller is programmed with an LED status subroutine invoked by a diagnosis mechanism to iteratively:
   a) check a case number that indicates a predetermined status of the power inverter; and
   b) turn the system status LED to a predetermined color and/or pattern based on the case number.

11. The inverter of claim 1, in which the message system includes a channel status LED for each input channel, and said digital microcontroller is further programmed with an LED status subroutine invoked by a diagnosis mechanism, for each input channel, to iteratively:
   a) check a case number that indicates a predetermined status of the input channel; and
   b) turn the channel status LED to a predetermined color and/or pattern based on the case number.

12. A multiple channel off-grid power inverter, comprising:
   a) at least two DC power input channels;
   b) an AC power output port arranged to supply AC power to an AC load;
   c) for each DC power input channel, a DC-DC boost converter arranged to convert the voltage of a DC power source to a higher DC voltage suitable for inversion;
   d) a DC power combiner connected to said DC-DC boost converters for combining the DC output from all DC-DC boost converters and allowing the said DC-DC boost converters to connect in parallel so that all DC currents are added together;
   e) a DC-AC inverter connected to said DC power combiner and arranged to invert the DC power to AC power;
   f) an internal AC powerline that allows the generated AC power to be sent to the AC load through an external AC powerline;
   g) a load interface circuit connected to said DC-AC inverter and to said internal AC powerline, said load interface circuit being arranged to filter high-frequency components out of the said DC-AC inverter's AC output;
   h) a load detector connected to said internal AC powerline and external AC powerline, and arranged to detect the impedance of the connected AC load;
   i) a digital microcontroller connected to said DC-DC boost converter, DC-AC inverter, load interface circuit, and load detector, said microcontroller arranged to monitor the DC boost voltage, control the DC-DC boost converter, perform maximum power point tracking (MPPT), perform DC-AC inversion, monitor AC current and voltage for generated power amount and status, perform powerline communications, check the impedance of the AC load to determine if it is within predetermined specifications, initially energize the internal and external AC powerline, continually deliver AC power to the internal and external AC powerline to allow the other power inverters also connected on the same external powerline to synchronize the AC power being produced, continually check and determine whether the AC load is too large or too small for the power generation system to handle, and turn the power off and trigger an error signal if the load is too large or too small;
   j) a powerline modem connected to said microcontroller and said internal AC powerline through an interface circuitry arranged to establish a 2-way digital signal communication between the digital microcontroller and the outside world through the external AC powerline;
   k) a line sensing circuit connected to said internal AC powerline and said microcontroller, and arranged to detect if there is AC power on the internal AC powerline prior to the startup of the inverter, and to monitor the internal AC powerline for over voltage, under voltage, over current, or under current conditions;
   l) a power supply connected to said DC power combiner and arranged to supply DC power to the electronic components of said power inverter; and
   m) a message system connected to said digital microcontroller and arranged to indicate the status of the off-grid power inverter and the status of each input channel.

13. The inverter of claim 12, in which said message system comprises:
   a) a plurality of LEDs (light-emitting diodes); and
   b) an LED driver circuit controlled by the digital microcontroller and arranged to turn the LEDs to a predetermined color and/or pattern to indicate the status of the power inverter and the status of each input channel of the power inverter.

14. The inverter of claim 12, in which said message system includes a system status LED to indicate that
   a) the inverter is working;
   b) the inverter is working but has warnings;
   c) the inverter has errors;
   d) the AC load has errors; and
   e) the inverter is off.

15. The inverter of claim 12, further comprising an enclosure, the elements a) through m) being disposed in or on the enclosure.

16. A method for indicating status, comprising:
   monitoring the status of a power inverter having multiple DC input channels and monitoring each of the input channels; and
   actuating LEDs (light-emitting diodes) based on the monitoring,
   wherein a system status LED is controlled and arranged to indicate that
   a) the inverter is working;
   b) the inverter is working but has warnings;
   c) the inverter has errors;
   d) the AC grid has errors; and
   e) the inverter is off.

17. The method of claim 16, for each input channel, a channel status LED is controlled and arranged to indicate that
   a) the input channel is working;
   b) the input channel has low input voltage;
   c) the input channel has errors;
   d) the input channel has warnings; and
   e) the input channel is off.

* * * * *